Dec. 30, 1952          R. TORRES          2,623,744

VEHICLE SUPPORTING STRUCTURE

Filed June 17, 1950          2 SHEETS—SHEET 1

INVENTOR.
ROBERTO TORRES

BY
L. S. Saulsbury
ATTORNEY

Dec. 30, 1952 R. TORRES 2,623,744
VEHICLE SUPPORTING STRUCTURE
Filed June 17, 1950 2 SHEETS—SHEET 2
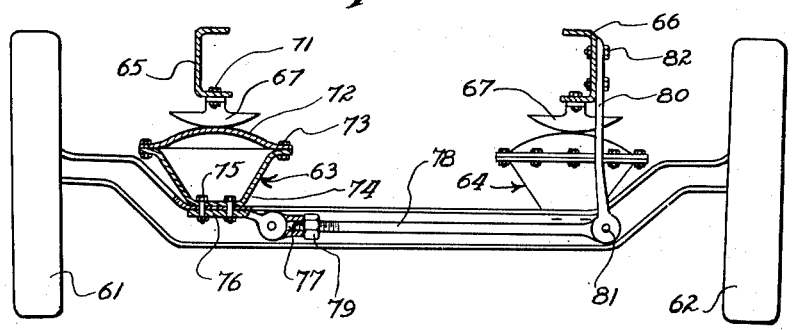
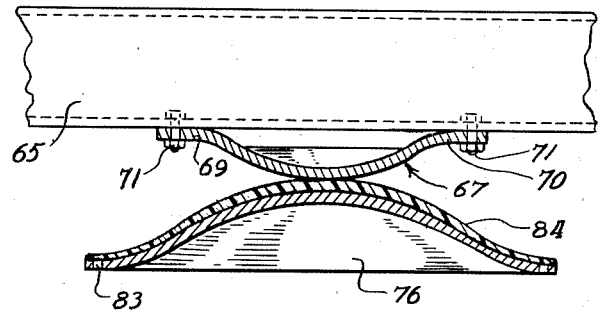
INVENTOR.
ROBERTO TORRES
BY
L. S. Saulsbury
ATTORNEY Patented Dec. 30, 1952

2,623,744

UNITED STATES PATENT OFFICE 2,623,744

VEHICLE SUPPORTING STRUCTURE

Roberto Torres, Mexico City, Mexico

Application June 17, 1950, Serial No. 168,719
In Mexico July 14, 1949

2 Claims. (Cl. 267—15)

This invention relates to vehicle supporting structures.

It is an object of the present invention to provide a vehicle suspension structure wherein the suspension action is effected through a combined diaphragm and air cushioning means and without the need of the usual suspension spring, either of the coil or leaf type, and in other words, whereby the usual springs used with these structures will have been eliminated.

It is another object of the present invention to provide a vehicle suspension structure which makes easy the equalization of the weight upon the structure and wherein, through air means and a diaphragm disposed above the air cushioning means, the load is taken and wherein through the compressed air supply a transfer of the air pressure from the elastic air means at the opposite sides of the suspension structure is made and whereby the compressed air supply tank becomes the equalizing medium.

It is another object of the invention to provide a simple means for controlling the alignment of the combined diaphragm and air cushioning devices beneath the sides of the vehicle frame and wherein adjustment can be effected for the same to align the devices and the axle laterally of the vehicle frame.

Other objects of the present invention are to provide a vehicle suspension structure which is simple in construction, inexpensive to manufacture, has a minimum number of parts, easy to adjust and align with the vehicle frame, compact and sturdy, durable and rugged and efficient in operation.

For other objects and for a better understanding of the invention, reference may be had to the following detailed description taken in connection with the accompanying drawing, in which Fig. 1 is a fragmentary perspective view of a vehicle suspension structure looking upon one end thereof and embodying the features of the present invention.

Fig. 4 is a front elevational view of a front axle and of a suspension structure constructed according to a modified form of the invention.

Fig. 5 is an enlarged fragmentary and sectional view of the frame and diaphragm engaging parts of the form of the invention shown in Fig. 4.

Fig. 6 is a perspective view of the frame engaging part.

Figure 1:
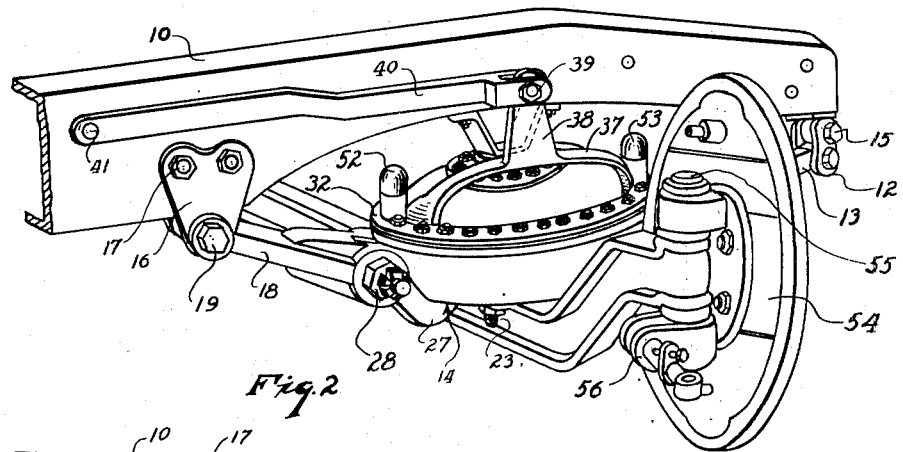
Figure 2:
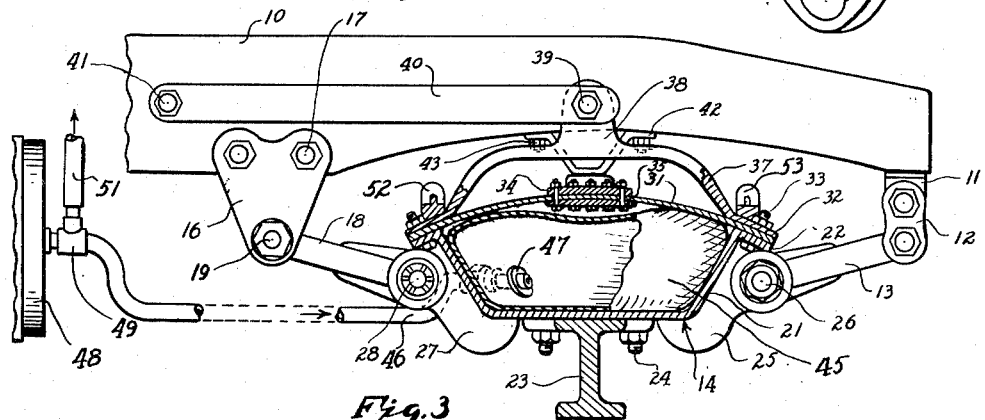
Fig. 2 is a fragmentary longitudinal sectional view of the suspension structure with parts being broken away and shown in section to show the interior construction thereof.
Figure 3:
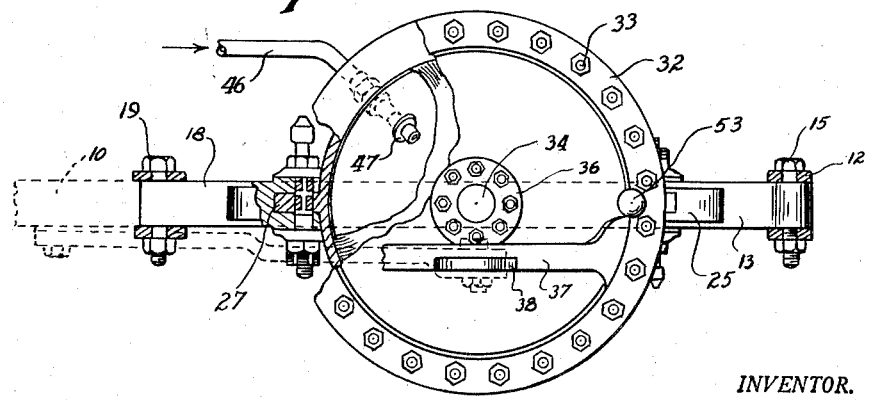
Fig. 3 is a fragmentary plan view of the structure with portions broken away and shown in section.

Referring now particularly to Figs. 1, 2 and 3, 10 represents the side channel member of a vehicle frame. This side member is bent down at its forward end where there is provided a connecting bracket 11 and shackle links 12 to which a suspension link 13 of one of the combined air cushioning and diaphragm units 14 is connected. This connection of the suspension link 13 is effected by bolt means 15. Rearwardly of the unit 14 there are connected brackets 16 by bolts 17 to the side frame member 10. To these brackets 16 there is connected a rear suspension link 18 by bolt means 19.

The device 14 comprises a cup-shaped casing 21 flanged at its upper end, as indicated at 22. This cup-shaped casing 21 is connected to a transverse axle 23 by bolts 24 and is thereby made rigid therewith. On the front part of the casing 21 is a lug 25 to which the suspension link 13 is connected by bolt means 26. On the rear end of the member 21 is a lug 27 to which suspension link 18 is connected by bolt means 28.

On the flange 22 there is secured a spring diaphragm 31 by means of a ring 32 and bolts 33. The center of the diaphragm is reinforced with clamped plates 34 and 35 secured respectively to the upper and lower surfaces of the diaphragm 31 by bolts 36. This ring 32 has an upstanding bail 37 with a projection 38 extending upwardly therefrom and connected by bolt means 39 to one end of a pivot brace arm 40. This brace arm extends along the side of the frame member 10 and rearwardly of the depending member 16, is pivotally connected by bolt means 41 to the side frame member 10. The forward end of the pivotable brace arm 40 is bifurcated, as shown in Fig. 1, for the connection with the upstanding projection 38.

To the under side of the side frame member 10 there is connected a U-shaped bracket 42 by bolts 43. The lower end of this bracket is adapted to engage with the top plate 34 on the diaphragm 31.

Within the casing 21 and beneath the diaphragm 31 is a flexible wall air receiver and cushion 45 to which a pipe 46 is connected by washer securing means 47. This pipe 46 leads from a compressed air tank 48. The pipe 46 has a T fitting 49 to which another pipe 51 is connected for supplying air under pressure to the air cushioning unit 14 located at the opposite side of the vehicle. The pressure in the tank and pipe lines is sufficiently high to maintain a substantial cushion under the diaphragm 31 and to support the vehicle frame in a retrograding manner as the bracket 42 bears on the diaphragm plates. As the diaphragm 31 is finally moved well into the casing 21, it may come to rest with the side frame member 10 engaging with bumper stops 52 and 53 disposed on the opposite sides of the ring 32. These stops may have a rubber head to give added cushioning effect even upon engagement of the stops.

By the provision of the fitting 49 and the parts 46 and 51 connecting together the compression tank 48 and the air cushioning and diaphragm units 14, there will be an equalization of pressure in the opposite units and in the compression tank whereby to transmit part of the load from one side of the vehicle to the other and to maintain the equilibrium of the vehicle. The entire system will thus act as a single shock absorbing unit.

The axle 23 is of the usual type and has on the opposite ends of the same the usual wheel hub structure 54 connected to the axle end through a pivot pin or bolt 55. A steering bracket or arm 56 is secured to the lower end of the pin.

Referring now particularly to Figs. 4, 5 and 6, there is shown a modified form of the invention. According to this form of the invention, there is provided on an axle 60 supported from wheels 61 and 62, two diaphragm devices 63 and 64 transversely spaced from one another and disposed directly under respective side frame members 65 and 66.

Connected to each of the side frame members is a semi-spherical or concave-convex pressure plate 67 adapted to engage with each of the diaphragm units. This pressure plate, as shown particularly in Fig. 6, has projections 68 and 69 having respectively holes 70 through which bolt means 71 may extend for the securement of the plate to the side frame piece. This plate bears upon a diaphragm 72 of each unit which is bolted by bolt means 73 to flanges of a cup-shaped member 74 that is in turn bolted to the upper edge of the axle 60 by bolt means 75.

By the bolt means 75 which secures the unit 63 to the axle 60, a bracket 76 is made secure to the transverse axle 60. This bracket has a threaded opening 77 through which a laterally extending rod 78 is connected and locked by a nut 79. This rod 78 is connected to the lower end of a depending anchor strap 80 by a pivot pin 81. The strap 80 is made secure to the side of the side frame member 66 by bolts 82. Through this strap 80 and rod 78 the diaphragm devices 63 and 64 are maintained in lateral and vertical alignment with the respective pressure plates 67.

The diaphragm 72 of each unit has peripheral openings 83 for receiving the respective bolts 73 that secures the diaphragm to the cup-shaped member 74.

The upper surface of the diaphragm 76 is provided with a resilent layer 84 whereby to prevent slippage of the pressure plate 67 upon each diaphragm.

It should now be apparent that there has been provided a vehicle suspension structure wherein utilization is made of combined diaphragm and air cushioning devices disposed under the opposite sides of the vehicle in engagement with the side frames thereof and supported by the transverse axle to thereby form a part of the suspension structure and wherein the usual springs have been suspended with. It will be apparent that a much more simple type of structure has been accordingly provided by this arrangement and that the assembly of the structure upon the vehicle frame is a simple operation.

While various changes may be made in the detail construction, it shall be understood that such changes shall be within the spirit and scope of the present invention as defined by the appended claims.

What is claimed is:

1. In combination, a vehicle frame having channel shaped side frame members, a transversely extending axle adapted to have wheels connected thereto, combined diaphragm and air cushioning devices connected respectively to the opposite ends of the axle and beneath the respective side frame members, each of said diaphragm and air cushioning devices including a dish-shaped casing member which is secured to the axle and which has a top peripheral flange inclined downwardly and outwardly, a concave-convex diaphragm resting over the flange of the casing member and enclosing the same, said diaphragm having a wear surface centrally thereof, a ring secured over the top of the flange and over the diaphragm, bolt means securing the ring and diaphragm to the flange, a bail projection integrally connected to the opposite ends of the ring and having an upstanding lug thereon, a swing arm member connected to the frame member for vertical pivotal movement and to hold the vehicle suspension structure against longitudinal displacement, said swing arm pivotally connected to the lug on the bail projection, said dish-shaped casing member having lugs extending radially from the opposite sides thereof, suspension links pivotally connected respectively to the radially extending lugs, shackle means for connecting one of the suspension links to the side frame member, depending bracket means for pivotally connecting the other suspension link to the side frame member, a depending bracket connected to the side frame member and engageable with the center of the diaphragm, a flexible wall air cushion disposed within the dish-shaped casing member and engaging with the diaphragm, an air pressure supply tank, pipe means extending to the devices and to the flexible wall air cushion whereby to provide air under pressure to said devices and to permit the equalization of the air pressure between the air cushions.

2. A vehicle supporting structure comprising a transversely extending axle adapted for the connection thereto of wheels, combined diaphragm and air cushioning devices connected respectively to the opposite ends of the axle, pressure members adapted for connection to the opposite sides of the vehicle frame, each of said combined diaphragm and air cushioning devices including a dish-shaped casing that is connected to the axle and a top diaphragm secured to the upper edge of the dish-shaped casing and adapted to be engaged by the pressure member, said diaphragm member being of concave and convex shape with the convex side presented to the pressure member and a ring clamp secured about the top of the dish-shaped casing and over the diaphragm, said ring clamp having a bail projection extending upwardly therefrom and offset from the center of the diaphragm, said bail projection having an upstanding lug, a swing arm pivotally connected to the upstanding lug and adapted to be pivotally connected at its other end to a side flange member.

ROBERTO TORRES.

REFERENCES CITED

The following references are of record in the file of this patent:

UNITED STATES PATENTS

| Number | Name | Date |
|---|---|---|
| 1,085,818 | Oxnard | Feb. 3, 1914 |
| 1,111,739 | Davis | Sept. 29, 1914 |
| 1,133,337 | Tinkham | Mar. 30, 1915 |
| 1,242,431 | Foster | Oct. 9, 1917 |
| 1,929,857 | Strauss | Oct. 10, 1933 |

FOREIGN PATENTS

| Number | Country | Date |
|---|---|---|
| 27,276 | France | Jan. 29, 1924 |
| 517,576 | France | Dec. 20, 1920 |
| 531,976 | France | Jan. 29, 1924 |